April 8, 1958 K. GEBELE 2,829,574
PHOTOGRAPHIC SHUTTER
Filed Nov. 2, 1953 3 Sheets-Sheet 1
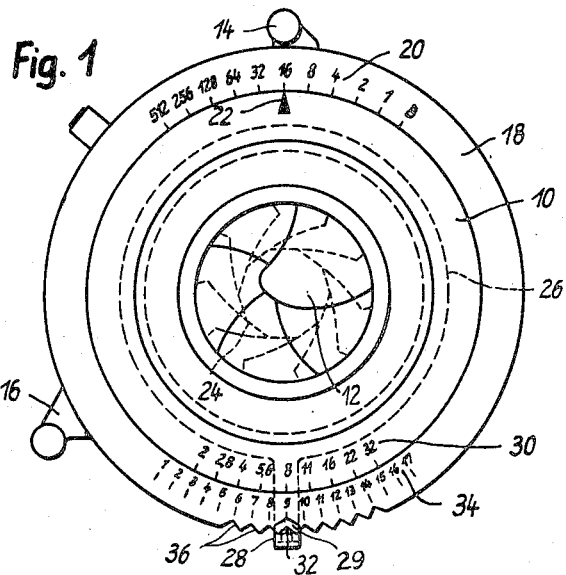
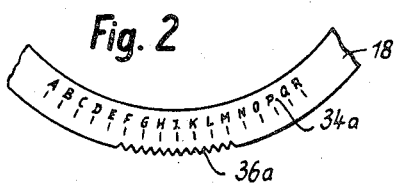
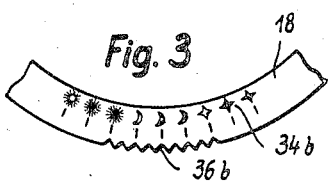
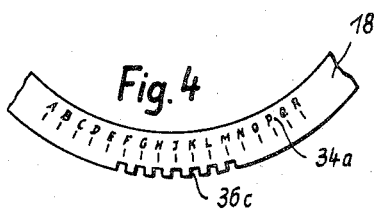
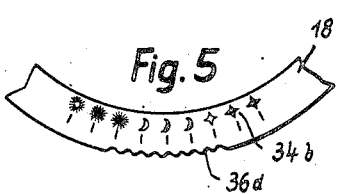
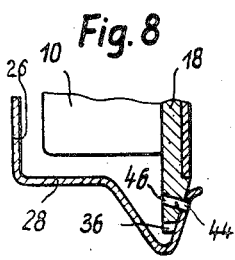
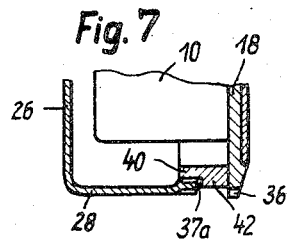
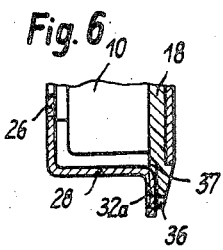

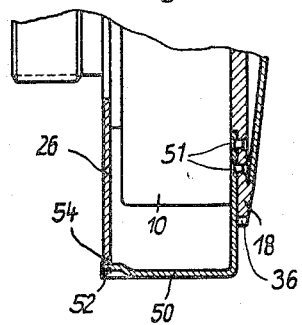
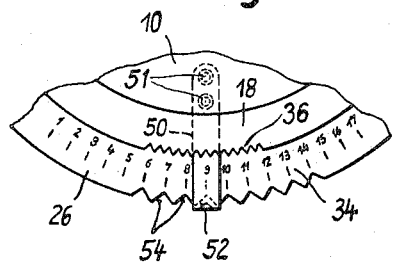
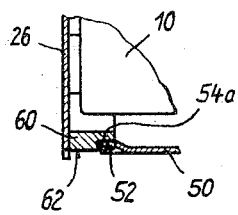
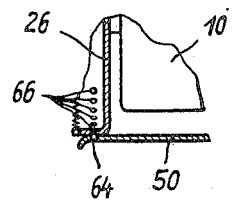

April 8, 1958     K. GEBELE     2,829,574
PHOTOGRAPHIC SHUTTER
Filed Nov. 2, 1953     3 Sheets-Sheet 3
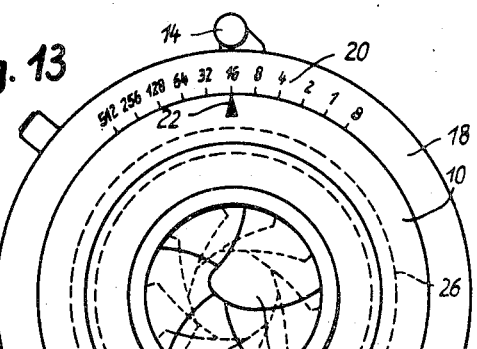
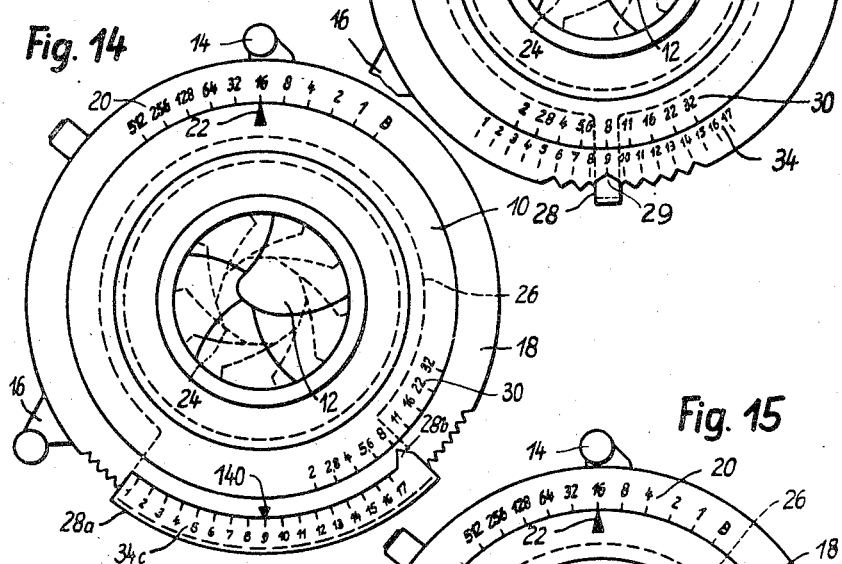
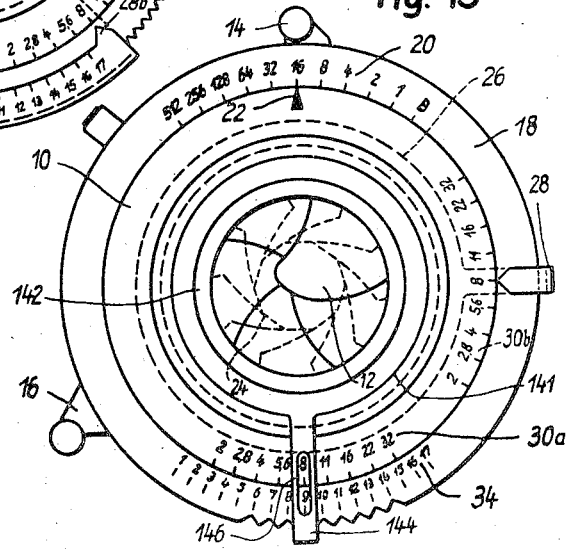

United States Patent Office 2,829,574
Patented Apr. 8, 1958

2,829,574
PHOTOGRAPHIC SHUTTER

Kurt Gebele, Munich, Germany, assignor to Hans Deckel, Munich-Solln, Germany, and Friedrich Wilhelm Deckel, Garatshausen, Post Tutzing, Germany Application November 2, 1953, Serial No. 389,775

Claims priority, application Germany November 7, 1952

1 Claim. (Cl. 95—64)

This invention relates to a photographic objective shutter or between-the-lens shutter, and especially to such a shutter having an adjustable diaphragm or stop which may be set to various aperture positions, in addition to a speed adjustment which may be set to vary the duration of the exposure.

An object of the invention is the provision of a generally improved and more satisfactory shutter of this kind.

Another object of the invention is to provide on an objective shutter, in a location readily accessible to the operator, a graduated scale element bearing values or graduations representing various possible relationships between the shutter speed and the diaphragm aperture or stop opening, in combination with a pointer element movable over the scale element and settable to different values indicated by the scale element, one of these two elements being operatively connected to the diaphragm adjusting mechanism and the other of these two elements being operatively connected to the shutter speed adjusting mechanism, so that when the pointer element is set at a particular preselected value on the scale element, it will indicate that the shutter is set for a particular relationship between shutter speed and aperture size, without indicating or being confined to any particular shutter speed or any absolute aperture size.

Still another object is the provision of a shutter so designed and constructed that the operator may easily, quickly, and without mental calculations adjust the shutter for picture taking, according to and by the use of values, factors, or index numbers which express a relationship between aperture and speed, without expressing any absolute values of either aperture or speed. These values or factors or index numbers involve a novel concept and may be conveniently referred to as total exposure values (or factors or index numbers) or integrated exposure values (or factors or numbers) and may for brevity be called the "i. e. v.," these letters standing for integrated exposure value or values. The i. e. v., according to the present invention, is intended to depend upon and make allowance for not only the brightness or light-value of the object being photographed, but also the speed rating or exposure index of the film being used, the filter factor required by any light filter which is to be used, and any other variables which should properly enter into the determination of the relationship between shutter speed and aperture size, such as the desire of the photographer to bring out detail in shadow areas, or to ignore such detail and concentrate on detail in highlights, and so forth. For any particular picture to be taken, the i. e. v. may be determined, for example, by taking a reading on a photoelectric light meter calibrated in terms of i. e. v. numbers or letters or symbols and making due allowance for film speed, filter factor, etc., either by separate calculations or by the use of means built into the light meter for that purpose.

A further object is the provision of simple, effective, and compact means not only providing an integrated exposure value scale, but also actually coupling the diaphragm adjustment member to the shutter speed adjustment member at any selected position of the i. e. v. scale, so that when either the shutter speed or the diaphragm adjusting member is moved, the corresponding adjustment is simultaneously and automatically made in the other.

A further object of the invention is the provision of coupling means between the shutter speed adjusting member and the diaphragm or stop adjusting member, so designed and constructed that if it is attempted to move one member beyond the point where the member coupled thereto reaches its limit of motion, the coupling will automatically slip so as to avoid damage to the parts, and will at the same time produce an audible signal or indication, warning the operator of the situation.

A still further object is the provision of a shutter in which the i. e. v. mechanism, whether with or without coupling means (and including the coupling means, if used) is so compact and light that it does not add appreciably to the size or bulk of the shutter and so that it may, therefore, be employed on modern shutters used on modern cameras, where the over-all dimensions of the shutter must be relatively small and where the parts must be so compact that they do not interfere with additional parts or attachments to be built into or used in conjunction with the shutter, such as special parts for opening the shutter blades and diaphragm leaves for focusing, or actuating mechanism for delayed release of the shutter trigger, or accessory flashguns, etc.

These and other desirable objects may be attained in the manner disclosed as an illustrative embodiment of the invention in the following description and in the accompanying drawings forming a part hereof in which:

Fig. 1 is a front face view, somewhat diagrammatic, of a shutter in accordance with a preferred embodiment of the present invention;

Figs. 2–5 are fragmentary views corresponding to the bottom part of Fig. 1, showing modified constructions of the integrated exposure value scale;

Figs. 6–9 are radial sections taken through the lower part of Fig. 1, illustrating various alternative constructions of coupling means for coupling the diaphragm adjustment to the speed adjustment;

Fig. 10 is a fragmentary front face view of the lower part of the shutter, further illustrating the modified construction shown in Fig. 9;

Figs. 11 and 12 are views similar to Fig. 9 showing other modifications;

Fig. 13 is a view similar to Fig. 1 showing another embodiment of the invention;

Fig. 14 is a view similar to Figs. 1 and 13 showing still another embodiment; and Fig. 15 is a view similar to Figs. 1, 13, and 14, illustrating a further embodiment of the invention.

The same reference numerals throughout the several views indicate the same parts.

Referring now to Fig. 1, there is here shown in front face view a photographic shutter of the objective type or between-the-lens type which, except for the changes mentioned below, may be of any conventional construction. For example, the shutter may (except for the mentioned changes) be of the construction available on the market under the trademark "Compur," manufactured by the Friedrich Deckel firm in Munich, Germany, such shutters being well known and widely distributed in the United States for many years past. Typical details of such a shutter are disclosed in U. S. Patent 1,687,123, granted October 9, 1928, for an invention of Deckel and Geiger.

In the drawings of the present invention, the shutter casing is indicated in general by the numeral 10. The shutter is provided with shutter blades 12 of any suitable number (five blades being here shown) moved to open and closed positions by the usual shutter operating mechanism such as shown in said patent. The driving spring of the shutter is tensioned and the other operating parts of the shutter are set in proper position ready for making an exposure, by a setting lever or tensioning lever 14, which corresponds to the setting lever 6 in said patent. The shutter release lever or trigger is indicated at 16 and corresponds to the release lever 101 in said patent. The adjustment to different exposure times, usually called the shutter speed adjustment, is effected by turning the rotatable shutter speed adjusting ring 18, which is rotatable at the front of the shutter about the optical axis of the shutter as a center, and which corresponds in general to the speed ring 63 of said patent, and which bears a speed scale or exposure time scale 20 corresponding to the scale 64 in said patent, cooperating with a stationary index mark or pointer 22 on the stationary front plate of the shutter.

The shutter is also provided with an iris diaphragm or stop comprising a number of leaves 24 adjustable to various positions to vary the diameter of the light aperture, the diaphragm leaves being of conventional form and being operated by the usual rotary adjusting ring, shown but not particularly described in said patent. The diaphragm leaves 24 are adjusted to give an aperture or stop of varying size, by turning an adjusting ring 26 mounted at the rear of the shutter casing 10 to turn in the usual way about the optical axis of the shutter as a center, and operatively connected to the diaphragm leaves.

As usual, the diaphragm adjusting ring 26 has a radial arm which extends downwardly (when viewed from the front as in Fig. 1) to a point below the lower edge of the shutter casing 10, thence forwardly as at 28 past the lower edge of the casing, to a position accessible at the front of the shutter, and this arm terminates in a pointer 29 from which, in conjunction with the f number aperture scale 30 on the stationary front plate of the camera, may be ascertained the particular aperture or stop to which the diaphragm is set in any given position of the adjusting ring 26 and its arm 28. For example, with the particular scale 30 shown in Fig. 1, and with the parts in the position illustrated, the pointer 29 is opposite the graduation 8 of scale 30, indicating that the diaphragm is set for f/8. If the adjusting ring 26 is turned clockwise as far as possible, the pointer 29 will be opposite the numeral 2 of the scale 30, indicating that the diaphragm leaves are open to their maximum extent, giving an aperture of f/2. If the adjusting ring 26 is turned counter-clockwise to its maximum extent, the pointer 29 comes opposite the numeral 32 of the scale 30, indicating that the aperture or stop is closed down to f/32.

The relationship between shutter speed and the size of the stop or diaphragm aperture is well known to experts, but is frequently confusing or unintelligible to beginners, who make up a considerable part of the camera-using public. To a beginner, or even to an amateur of some experience, it is often a difficult matter not only to correlate shutter speed and aperture to each other, but also to correlate both of these variables to the brightness of light on the object to be photographed, to the speed rating or exposure index of the film being used, and to the filter factor required by the filter, if any, which is being used. Up to the present time, there has been no easy way in which the uninitiated photographer may make the needed speed and aperture adjustments of the shutter, quickly and without mental calculations and without reference to extraneous tables or charts.

The present invention approaches the problem from a basically new direction, and aims to provide the photographer with a convenient scale on the camera shutter itself, indicating various possible relationships between aperture and speed, which the photographer may use in making quick and easy adjustment of the shutter. As already mentioned, this new scale is the integrated exposure value scale, or i. e. v. scale. In any suitable manner, such as by using a light meter or by simple visual inspection and estimate, the photographer determines the proper i. e. v. for the particular picture to be taken. Once the proper i. e. v. has been determined, the shutter may be easily adjusted by using the i. e. v. scale, and an inexperienced photographer need not particularly concern himself with separate values of speed and aperture.

As the photographer gains further experience and knowledge, and comes to realize that for any particular i. e. v. setting, there will be many different shutter speeds available (if aperture is correspondingly changed) or many different apertures available (if speed is correspondingly changed), he will take advantage of a larger aperture when it is desired to focus critically upon a particular object, and a smaller aperture when a greater depth of field is desired, and he will select, of course, a faster shutter speed when the picture is to include a moving object. But even to a user who realizes these possibilities and who knows how and when to select a large or small aperture, or a faster or slower shutter speed, the i. e. v. scale will be a great help, for it will enable him, upon selecting the desired aperture, to obtain the correct speed setting, or upon selecting a desired shutter speed, to obtain the correct aperture for that speed, entirely from the shutter itself and without the need for any mental calculations and without consulting any extraneous reference material. To the novice who does not understand different apertures or the need for changing aperture when speed is changed, the new concept of i. e. v. will be of inestimable help, as it will enable him easily to make acceptable pictures of average scenes, where neither speed nor apertures are critical so long as they have the proper relationship to each other.

In the preferred form of the invention, the i. e. v. scale is indicated at 34 and is engraved or otherwise formed on the shutter speed setting ring 18, so as to turn bodily with the ring 18 when the shutter speed is adjusted. It is in position to cooperate and be read with the aid of the pointer 29 connected to the diaphragm adjusting ring 28. This scale 34 is graduated in any suitable manner, preferably by graduations bearing consecutive numbers, such as the numbers from 1 to 17, as shown in Fig. 1.

It should be noted that, contrary to the arrangement shown in said Patent 1,687,123, the shutter parts are arranged in such manner that when the shutter speed adjusting ring 18 and the diaphragm adjusting ring 26 are turned in the same direction, they produce a complementary effect on the shutter speed and the size of the aperture. In other words, if a clockwise turning of the speed ring 18 adjusts the shutter for making an exposure of shorter duration, then clockwise turning of the diaphragm ring 26 serves to open the diaphragm or stop to compensate for the shorter exposure; and conversely, counterclockwise turning of the shutter speed ring 18 will result in an exposure of longer duration, while counterclockwise turning of the ring 26 will decrease the aperture to compensate for the longer exposure. This can be accomplished by reversing the slope of the time control cam on the ring 18, relative to the slope illustrated in said Patent No. 1,687,123.

Also it is to be noted that the time scale or shutter speed scale 20 on the speed adjusting ring 18 is preferably not graduated in the conventional manner, but rather is graduated in a uniform scale of geometrical progression from the slowest speed toward the fastest speed, each successive graduation representing an exposure time one-half as great as that indicated by the next preceding graduation. Thus, where the numerals associated with the graduated scale represent an exposure of that faction of a second whose numerator is understood to be 1 and whose denominator is the numeral appearing on the scale 20, the graduations may conveniently run in the series 1, 2, 4, 8, 16, 32, 64, 128, 256, and 512, with preferably uniform spaces between the successive scale markings indicated by these numerals. This scale can be achieved, as understood by those skilled in the art, by the proper design of the internal mechanism of the shutter, especially the slope and position of the time control cam forming part of the ring 18.

Another point to be noted is that the scale 30, representing the extent of opening or closing of the diaphragm aperture or stop, is preferably so arranged that equal increments of motion of the ring 26, at all intervals along the scale, will result in equal proportionate increases or decreases in aperture; and also the extent of angular motion of the diaphragm ring 26 required to double the area of the aperture, is the same as the angular extent of motion of the speed adjusting ring 18 required to cut the exposure time in half. This is not true of conventional shutters as heretofore commonly constructed. In the conventional shutters as commonly used, the diaphragm scale is more open, with graduations spaced farther apart, at the large aperture end of the scale, and closer together or more crowded at the small aperture end of the scale. Although not commonly used in the past, iris diaphragms are already known in which equal angular movements of the adjusting ring will produce equal proportionate change in the aperture area (for example, U. S. Patent 871,654, of November 19, 1907, and British Patent 464,892, of April 27, 1937) and these principles may be employed in the construction of the present diaphragm, to achieve equal angular movements of the adjusting ring 26 for producing equal proportionate changes, such as doubling the area of the stop or reducing the area by one-half. However, so far as known, a diaphragm of the uniform scale type has never heretofore been used in combination with a shutter having a speed setting or speed control correlated with the diaphragm setting as is done in the present instance, nor in combination with an integrated exposure value scale, as in the present instance.

When the integrated exposure value is determined, as for example by using a photoelectric light meter to determine the brightness of the subject to be photographed, and by applying a suitable allowance or factor for the filter, if any, which is to be used in taking the picture and for the speed rating or exposure rating of the film which is to be used, let it be assumed that the resulting i. e. v. turns out to be "9." Then, according to the present invention, if the pointer 29 is brought opposite the scale numeral 9 on the i. e. v. scale 34, and is kept opposite this scale numeral notwithstanding any adjustments made either in the aperture or in the shutter speed, the shutter will be properly set for taking the picture. It will be observed from what has been said above that the correlation of the pointer 29 to the scale 34 represents a given relationship between shutter speed and the aperture or "f" number, rather than an absolute value of either one of these two variables. Either one of the two variables (aperture and shutter speed) may be selected as desired, and if the pointer 29 is kept at the proper point on the scale 34, the other one of the two variables will automatically be accommodated to the variable whose value is first chosen.

With the particular scale arrangement illustrated in Fig. 1 of the present drawings, it is seen that an exposure value of 9 on the integrated exposure value scale 34 may correspond to a speed setting of 16 (meaning 1/16 of a second) and to a diaphragm setting or aperture setting of 8 (meaning f/8). But it may equally well correspond to a speed setting of 32 and an aperture of 5.6, or to a speed setting of 64 and an aperture of 4, or a speed setting of 8 and an aperture of 11. In other words, if the speed control ring 18 is turned any given number of graduation increments in one direction or the other from the illustrated setting of 16, and if the diaphragm adjusting ring 26 is turned in the same direction through an equal number of increments or steps, the pointer 29 will still be opposite the numeral 9 of the scale 34, and the shutter will still be properly adjusted for taking the desired picture. Thus the operator is free to choose any desired shutter speed, and without mental calculations or difficulty he can easily bring the diaphragm to the proper aperture or stop for the selected shutter speed, simply by moving the diaphragm adjusting ring 26 until the pointer 29 is opposite the proper numeral on scale 34, corresponding to the integrated exposure value as determined by the light meter or otherwise. Similarly, if he desires to approach the problem from the standpoint of selecting an aperture rather than selecting a shutter speed, he is free to select any desired aperture, bringing the pointer 29 opposite the selected aperture on the scale 30, and the shutter speed will be automatically adjusted to the proper amount if the ring 18 is turned to bring the determined i. e. v. graduation of the scale 34 opposite the pointer 29.

It is within the scope of the present invention to manipulate the ring 18 and the ring 26 separately, first setting either desired one of these rings to the selected shutter speed or aperture, as the case may be, and then moving the other one of the rings, so that the pointer 29 and the selected or determined exposure value graduation of the scale 34 will be opposite each other. However, in the preferred form of the invention the rings 18 and 26 are resiliently coupled to each other so that when either one of them is moved, the other ring is likewise automatically moved in the proper direction and to the proper extent to compensate for the movement of its companion ring. To this end, the arm 28 of the diaphragm adjusting ring 26 is formed with a projection or protuberance 32 (conveniently in the form of a short pin) which engages resiliently in shallow serrations or teeth 36 formed around the periphery of the speed adjusting ring 18. Teeth or serrations of this kind are already frequently used on shutters of this general style for enabling the user to get a better grip on the speed adjusting ring 18. The same teeth of conventional form as commonly used on "Compur" shutters will adequately serve the present purposes. These teeth or serrations 36 extend all the way around the periphery of the setting ring 18, although for convenience and simplicity of illustration they are shown in Fig. 1 as extending around only a fraction of the periphery.

The arm 28 of the setting ring 26 is of metal sufficiently resilient or springy so that the protuberance 32 can easily spring out of any one of the notches 36 and can ratchet over a series of such notches, if one of the members 18 and 26 is gently turned by hand and if there is resistance to turning the other. Thus it is easy for the operator to adjust the parts to any desired setting of the pointer 29 to a selected one of the graduations 34, simply by holding one of the rings and turning the other one. Likewise, if the parts happen to be set in such position that one of the rings reaches its extreme limit of travel while the other one is still being turned, the pin 32 will ratchet over the teeth 36 and will make a clicking noise, audibly calling the operator's attention to the fact that the limit of travel of one of the adjusting members has been exceeded and that the setting of the parts to a preselected or predetermined integrated exposure value or total exposure factor has been disturbed.

With this construction it is seen that a very inexperienced photographer may obtain good results in taking pictures under a great variety of circumstances. So long as he is able to obtain, by means of a light meter or otherwise, the proper total exposure factor or integrated exposure value which is to be used, it is then a simple matter for him, without mental calculations, to set the pointer 29 to the determined value or factor on the scale 34. After that, he can adjust the shutter speed as desired and such adjustment will automatically cause corresponding adjustment of the diaphragm or stop; or he can adjust the diaphragm or stop as desired, and such adjustment will cause automatic compensating adjustment of the shutter speed. To obtain excellent results under typical "snapshot" circumstances, he does not even need to have enough experience or knowledge to realize that when the shutter is set for a faster speed, the diaphragm opening must be increased, or that when the diaphragm opening is decreased, the shutter must be set at a slower speed.

In the preferred form of the invention, the i. e. v. scale is calibrated in numerals as indicated at 34 in Fig. 1, but this is not necessarily the case. It may be calibrated in letters of the alphabet as indicated at 34a in Figs. 2 and 4, or in appropriate symbols as indicated at 34b in Figs. 3 and 5. Also, variations in the teeth on the ring 18 are possible. In the preferred form the teeth 36 (Fig. 1) are of sharp triangular formation and are of fairly large size, the tooth spacing being equal to the spacing of the graduations on the scale 34. But in Figs. 2 and 3 the teeth 36a and 36b, while still triangular, are smaller, there being a multiple number of teeth (for example two teeth) for each division of the scale. In Fig. 4, the teeth 36c are rectangular rather than triangular, while in Fig. 5 the teeth 36d are shallower and of wavy form rather than triangular with sharp corners. The various tooth forms may be used in any desired combination with the various forms of the scale values.

While the preferred form of the invention employs the regular grip notches 36 in the periphery of the speed setting ring 18 to form the frictional coupling engagement with the pin 32 on the diaphragm setting arm 28, this is not necessarily the case. It is entirely feasible to provide special notches or teeth for coupling the parts, other than the grip notches 36. For example, as seen in Fig. 6, the rear face of the ring 18 is provided, near its periphery, with radial notches or recesses 37 in addition to the grip notches or teeth 36. The resilient arm 28 of the diaphragm adjusting ring 26 is provided with a cam-shaped projection or nose 32a which engages in one or another of the notches 37, to effect the resilient coupling between the parts. The end of the arm 28 extends radially outwardly a little beyond the periphery of the ring 18 to form a visible pointer or indicator which can be seen from the front of the shutter.

A slightly different form is illustrated in Fig. 7, where the coupling recesses or notches 37a are formed on the periphery of an arcuate segment 40 fixed rigidly to the rear face of the speed adjusting ring 18. In this case, the integrated exposure value scale or graduations are arranged on the periphery 42 of the segment 40, right beside the recesses 37a, and may be graduated in numerals, letters, or symbols, like the various forms illustrated in Figs. 1–3. Of course when a supplementary segment 40 is employed, the coupling teeth or notches are not necessarily on the periphery 42 but may be formed on any desired face of the segment, for cooperation with the appropriate nose or edge of the resilient arm 28.

Another variation of the coupling means is shown in Fig. 8, where the resilient arm 28 of the ring 26 is provided with a short pin 44 which engages with an arcuate series of holes 46 formed in the speed setting ring 18 in an arc just above the grip teeth 36. The front face of the ring 18 is graduated with the integrated exposure value scale.

In all of the constructions above illustrated, the coupling is effected by a resilient arm on the diaphragm setting ring, movable to various positions on the relatively non-resilient speed setting ring 18. It is possible, however, to reverse the resilient action of the parts, placing the resilient member on the speed setting ring 18, and having it cooperate with a relatively non-resilient member on the diaphragm setting ring 26. Such a construction is shown in Figs. 9–12.

Referring first to the structure illustrated in Figs. 9 and 10, the diaphragm setting ring 26, or at least the lower part thereof, for the necessary arcuate distance, is extended to be of larger diameter than the main shutter casing 10, and is provided peripherally with teeth or notches 54. The i. e. v. scale 34 is marked on the front face of this portion of the ring 26, just above the notches 54. A resilient arm 50 is rigidly secured (for example, by rivets 51) to the speed setting ring 18 and extends radially downwardly a slight distance and then rearwardly to the plane of the diaphragm setting ring 26, where the arm 50 is provided with a cam-shaped nose 52 fitting in one or another of the notches 54 on the ring 26. The arm or tongue 50 is sufficiently springy so that, by exerting moderate pressure, the nose 52 may be displaced from one notch 54 to the next. The regular grip notches 36 are still employed on the speed setting ring 18, but they serve only the function of grip notches, without taking part in the coupling of the speed ring to the diaphragm ring. In this particular embodiment of the invention, the aperture scale 30 to indicate the size of the diaphragm opening may be entirely omitted for the sake of greater simplicity, although if desired the diaphragm ring 26 may be provided with a pointer arm coming around the edge of the shutter in the conventional manner to cooperate with an aperture scale 30 at a suitable point on the front of the shutter.

In the construction shown in Fig. 11 the coupling recesses or teeth 54a are not arranged directly on the diaphragm adjusting ring 26, but are formed on an arcuate segment 60 which is rigidly connected to the ring 26. As before, the resilient arm 50 is connected to the speed setting ring 18 and has a nose or cam portion 52 cooperating with the coupling recesses 54a. The integrated exposure value scale is placed on the periphery 62 of the arcuate segment 60. The construction represents essentially a reversal of the construction shown in Fig. 7, the annular segment and the resilient arm simply being reversed relative to the respective speed setting ring 18 and diaphragm setting ring 26. Just as mentioned in connection with Fig. 7, it is not necessary that the coupling recesses or teeth 54a be placed on the outer arcuate surface as illustrated, as they can be placed on the inner arcuate surface or the forward surface of the segment 60.

In the alternative construction shown in Fig. 12, the diaphragm setting ring 26 is provided with a rearwardly extending flange in which are formed holes 66. The resilient arm 50 mounted on the speed setting ring 18 is provided with a pin 64 which extends into one or another of the holes 66, depending on the setting desired. The exposure value scale in this instance may be placed on the rearwardly extending flange or periphery in which the holes are formed.

In the various constructions illustrated in Figs. 1 and 6–12, there is a physical coupling between the shutter speed setting ring 18 and the diaphragm or stop setting ring 26, so that when the coupling mechanism has been set to the desired integrated exposure value, thereafter the photographer is free to change both the speed setting and the stop setting in a complementary manner, simply by turning one of these rings. This physical coupling is preferred, because it avoids any possibility of the photographer forgetting to change the diaphragm setting if he decides, after making a previous adjustment, that he wants to change the speed setting, or vice versa. Also the physical coupling simplifies the operation, since there is only one member to be grasped and moved (after the integrated exposure value scale is properly set) instead of requiring separate manipulation of two members. However, it is apparent that many of the advantages of the present invention may still be achieved even if there is no physical coupling between the speed setting member and the diaphragm or stop setting member. Even without the physical coupling, there still is an advantage in using the integrated exposure value scale, because, once the proper integrated exposure value has been determined, the use of the scale indicates quickly where the diaphragm adjusting member should be set for any particular shutter speed which may have been selected, or where the shutter speed adjusting member should be set for any particular diaphragm aperture selected. This is of great help especially to the beginner, and is of advantage even to a more experienced photographer since it avoids the need for either mental calculation on the one hand, or consultation of extraneous reference material on the other hand, as might be necessary if the photographer desires to change the diaphragm aperture, for example, from f/4 to f/16 and then wonders just how far to change the speed setting of the shutter in order to compensate for this change in diaphragm aperture.

A construction having the advantages of the present invention except for the physical coupling between the speed setting mechanism and diaphragm setting mechanism, is illustrated in Fig. 13. This construction may be the same as the construction shown in Fig. 1 except that the coupling pin or nose 32 is omitted. The respective scales 20, 30, and 34 are the same as in Fig. 1.

In using this construction, whichever variable is first selected by the operator (either shutter speed or diaphragm aperture) is appropriately adjusted; then the other one of the two variables is adjusted so that the pointer 29 and the desired graduation of the integrated exposure value scale 34 are opposite each other. If the user desires afterwards to change the shutter speed or the diaphragm aperture, the two adjusting members are appropriately changed, and in making the new setting the pointer 29 is still kept at the desired point on the i. e. v. scale 34, to keep the speed and the aperture in proper correlation to each other, notwithstanding changes in adjustment. When manually turning the speed setting ring 18, one of the fingers grasping this ring can be placed on the periphery of this ring alongside of the arm 28 of the diaphragm setting ring 26, and in this way, with a little practice, the photographer is able actually to move the two adjusting members simultaneously while keeping the same integrated exposure value, notwithstanding the lack of a physical coupling (except through the finger of the operator) between the two adjusting members.

In the embodiments shown in Figs. 1 and 13, the i. e. v. scale has been placed on the speed setting ring 18, while in Figs. 9–12 the scale has been placed on the aperture adjusting member, but in a location rearwardly of the front face of the shutter. However, it is equally possible to place this scale on the aperture adjusting member at the front of the shutter, as in Fig. 14, by extending the aperture setting member forwardly at the bottom of the shutter and providing it with a segmental flange 28a on which the i. e. v. scale 34c is placed for cooperation with an index mark 140 placed on the speed adjustment ring 18. An index mark such as the nose 28b on the aperture setting member 28a cooperates with the aperture scale 30 formed on the stationary front plate of the shutter, to show at what aperture the shutter diaphragm is set, at any given time. This construction shown in Fig. 14 is equally possible with or without the use of physical coupling between the speed adjusting member and the diaphragm adjusting member.

In the preferred form of the invention, the speed graduations 20 and the aperture graduations 30 are both graduated linearly according to a geometrical progression, but this is not necessarily the case. So long as the actual effect of the speed control cams on the ring 18 is to produce a change in speed correlated with the change in aperture produced by an equal extent of turning movement of the diaphragm adjusting member 26, it is apparent that the i. e. v. scale 34 may be advantageously used, and that the speed adjusting member and diaphragm adjusting member may be physically coupled together, quite regardless of the exact graduations or numerals which appear on the scale 20. Since it is the i. e. v. scale 34 which is used to correlate the shutter speed to the diaphragm aperture and since the speed rating numerals of the scale 20 are not used for this purpose but only to give the photographer an indication of shutter speed in case he may wish to photograph a moving object, it is apparent that the speed scale 20 may be graduated, if desired, in the more familiar manner of arbitrary numbers such as 1, 2, 5, 10, 25, 50, etc., so long as the speed control cam is nevertheless of the proper shape to change the speed of the shutter according to a geometrical progression correlated with that of the aperture adjusting member.

Indeed, some of the advantages of the invention (although not all of them) may be attained by using an integrated exposure value scale or total exposure factor scale, even in conjunction with shutters in which the rotary motion of the speed adjusting member is not correlated with but is in complete disconformity to the rotary motion of the diaphragm adjusting member, such as shutters in which the diaphragm aperture scale is non-linear, or in which the speed adjustment scale is non-linear, or even requires movement in a direction opposite to that of the aperture adjustment member in order to make complementary changes. Nevertheless, it is possible according to the present invention to provide a total exposure factor scale or integrated exposure value scale on the shutter, for the use of the operator in setting both speed and aperture even though they must be separately set by hand, without any physical coupling, because of disconformity or non-correspondence between the speed scale and the aperture scale.

An example of the use of the i. e. v. scale on a shutter which may have disconformity between the speed setting and the aperture setting means is illustrated in Fig. 15. Here, an integrated exposure value scale 34 is placed on the speed setting ring 18 just as in the case of the embodiment of Fig. 1. Immediately above the scale 34, the stationary front plate of the shutter has an aperture scale 30 like the scale 30 in Fig. 1, graduated in proper correlation to the speed adjustment changes produced by turning the speed ring 18. A ring 141 is rotatably supported on the front lens tube 142 of the shutter casing, and has a radial guide arm or reading arm 144 provided with an elongated radial sight window 146 through which may be simultaneously read one value from the scale 34 and one value from the scale 30. A second diaphragm aperture scale 30b, graduated in accordance with the actual aperture changes produced by turning the ring 26, is arranged at another suitable location on the stationary front plate of the shutter, to cooperate with the arm 28 on the diaphragm adjusting ring 26.

In the use of this form of the invention, the proper integrated exposure value is obtained, as before, by means of a light meter or by visual inspection and estimate. Let it be assumed that the exposure value is determined as 9. The photographer then selects either the desired shutter speed or the desired aperture for the exposure to be made. Assuming that he selects a shutter speed of 1/16 of a second, he sets the speed control ring 18 to bring the numeral 16 opposite the index mark 22, as shown in Fig. 15. Then the radial arm 144 is brought around to the position where the numeral 9 of the i. e. v. scale 34 shows through the reading window 146. Immediately above this numeral 9 is seen, also thorough the window 146, the numeral 8 on the aperture scale 30, thus indicating that for this particular shutter speed and for an i. e. v. of 9, the diaphragm aperture must be set at 8. Then the diaphragm is adjusted to aperture 8 by moving the arm 28 relative to the aperture scale 30b.

On the other hand, if the photographer first selects the aperture, deciding that he wants to take the picture with an aperture of 8, he moves the arm 28 to this aperture setting on the scale 30b, then moves the arm 144 until the aperture 8 of the scale 30 appears through the window 146. Then the ring 18 is turned until the i. e. v. graduation 9 of the scale 34 appears through the window 146, which brings the speed setting to the proper correlation with the aperture setting, all without the need of any mental calculations by the photographer and without the need for consulting any extraneous reference material other than what is available right on the shutter itself.

It is apparent that with this construction, the advantages of using the new concept of an integrated exposure value or total exposure factor are retained, even though the shutter may be of a kind or style in which the speed scale 20 and the aperture scale 30b are non-linear and are in complete disconformity to each other, perhaps even being arranged in reversed or counter directions instead of in correlated directions. Of course, the i. e. v. scale could be arranged on the diaphragm setting member rather than on the speed setting member, just as was done in the construction of Fig. 14, and in that event a shutter speed scale would be placed on the stationary front plate of the shutter, to be read in conjunction with the i. e. v. scale, by means of the radial reading arm or guide.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

When speaking of adjusting the shutter speed and the diaphragm aperture to complementary extents or in a complementary manner, these expressions are to be understood as meaning that if the duration of the exposure is made twice as long, for any given set of circumstances, the area of the diaphragm aperture is to be made one-half as great as before; or if the duration of the exposure is made half as long, then the area of the diaphragm is to be made twice as great, so that the product of aperture area times exposure duration remains substantially constant, for any given set of fundamental conditions such as brightness of illumination, film speed, and filter factor. Of course it is well known that if the diaphragm aperture is expressed as an $f$ number, the $f$ number is in inverse proportion to the diameter of the aperture, not its area, and since the area changes in proportion to the square of the diameter, it follows that the area of the aperture will vary in inverse proportion to the square of the $f$ number. Hence if a proper duration of exposure is determined when the diaphragm aperture is set at $f/8$, a readjustment of the diaphragm aperture to $f/16$ will require that the duration of exposure be not merely doubled, but be made four times as great as before; for example, an exposure of ¼ of a second instead of 1/16 of a second. All of this is well understood in the photographic art, and is here mentioned only to clarify what is meant when referring to complementary adjustments of shutter speed and diaphragm aperture.

What is claimed is:

A photographic shutter comprising an annular housing having an exposure aperture therethrough, a stationary front member encircling said aperture, a shutter speed adjusting member of annular form rotatably mounted on said housing and partly underlying said stationary front member and partly projecting radially outwardly beyond said stationary front member to an accessible peripheral edge for manual grasping and turning, a single reference point marked on said stationary front member, a shutter speed scale marked on said speed adjusting member in position to move past said reference point as said speed adjusting member is turned relative to said stationary front member and to be read in conjunction with said reference point, a diaphragm aperture adjusting member of annular form rotatably mounted on said housing approximately at the rear thereof and having an arm extending forwardly past a circumferential edge of said housing, a portion of said arm being resilient, said arm near its forward end engaging in depressions in said shutter speed adjusting member at a portion of the periphery thereof angularly spaced from said shutter speed scale with sufficient force to couple said aperture adjusting member frictionally to said speed adjusting member so that when either one of said adjusting members is turned the other one will normally turn with it unless forcibly restrained from turning in order to change the relative orientation of said two adjusting members with respect to each other, a light value scale marked on said speed adjusting member on the portion thereof in proximity to said arm of said aperture adjusting member, so that the relation of said arm to said light value scale will indicate the relative orientation of said two adjusting members, and a diaphragm aperture scale marked on said stationary front member in proximity to said light value scale, the position of said arm relative to said aperture scale serving to indicate the diaphragm aperture for which said aperture adjusting member is set at any given moment.

References Cited in the file of this patent

UNITED STATES PATENTS

| | | |
|---|---|---|
| 1,543,208 | Fairchild | June 23, 1925 |
| 1,623,998 | Cook | Apr. 12, 1927 |
| 2,590,161 | Dorsey | Mar. 25, 1952 |
| 2,596,328 | Dorsey | May 13, 1952 |

FOREIGN PATENTS

| | | |
|---|---|---|
| 7,787 | Great Britain | Mar. 27, 1914 |
| 303,088 | Germany | Jan. 18, 1918 |
| 1,028,877 | France | Mar. 4, 1953 |